(12) United States Patent
Dismukes et al.

(10) Patent No.: US 10,358,727 B2
(45) Date of Patent: Jul. 23, 2019

(54) NICKEL PHOSPHIDES ELECTROCATALYSTS FOR HYDROGEN EVOLUTION AND OXIDATION REACTIONS

(71) Applicant: Rutgers, The State University of New Jersey, New Brunswick, NJ (US)

(72) Inventors: G. Charles Dismukes, Princeton, NJ (US); Anders Laursen, New York, NY (US); Martha Greenblatt, Highland Park, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 363 days.

(21) Appl. No.: 15/109,348

(22) PCT Filed: Dec. 31, 2013

(86) PCT No.: PCT/US2013/078486
§ 371 (c)(1),
(2) Date: Jun. 30, 2016

(87) PCT Pub. No.: WO2015/102618
PCT Pub. Date: Jul. 9, 2015

(65) Prior Publication Data
US 2016/0355936 A1    Dec. 8, 2016

(51) Int. Cl.
*C25B 1/00*    (2006.01)
*C25B 1/04*    (2006.01)
(Continued)

(52) U.S. Cl.
CPC .......... *C25B 11/0447* (2013.01); *C25B 1/003* (2013.01); *C25B 1/04* (2013.01);
(Continued)

(58) Field of Classification Search
CPC .............. C25B 11/0447; C25B 1/02–10; B01J 27/1853
See application file for complete search history.

(56) References Cited

U.S. PATENT DOCUMENTS 4,184,941 A * 1/1980 Carlin ................. C25B 11/0447
204/292
2010/0291460 A1 11/2010 Adachi et al.
(Continued)

FOREIGN PATENT DOCUMENTS

WO    2011116236 A2    9/2011
WO    2013042746 A1    3/2013

OTHER PUBLICATIONS

Wu, et al.: "High-Perforamnce Phosphide/Carbon Counter Electrode for Both Iodide and Organic Redox Couples in Dye-Sensitized Solar Cells", Journal of Materials [online], Mar. 28, 2012 {Retrieved on May 4, 2014], vol. 22, pp. 11121-11127, Retrieved from teh Internet: <URL: 10.1039/c2jm30832k>, p. 11121, col. 2, para 3; p. 11122, col. 1, para 2 to p. 11123, col. 2, para 1; p. 11126, col. 1, para 2.
(Continued)

*Primary Examiner* — Nicholas A Smith
(74) *Attorney, Agent, or Firm* — Fox Rothschild LLP

(57) ABSTRACT

Disclosed are cathodes comprising a conductive support substrate having a catalyst coating including $Ni_5P_4$ nanocrystals. The conductive support substrate is capable of incorporating a material to be reduced, such as water or hydrogen cations. Also disclosed are methods for generating hydrogen gas from water via an electrolysis reaction or from the reduction of hydrogen cations, wherein the catalyst is part of a conductive support within a cathode, including (a) placing an anode and the inventive cathode in an electrolyte, (b) placing the anode and cathode in conductive contact with an external source of electricity, (c) providing a source of
(Continued)

water to the cathode, and (d) using the external source of electricity to drive an electrolysis reaction at the cathode, whereby the hydrogen gas is generated from water. In certain embodiments, the reaction uses a free catalyst, wherein the catalyst is placed in proximity to the cathode.

22 Claims, 5 Drawing Sheets

(51) Int. Cl.
  *C25B 9/10* (2006.01)
  *C25B 9/16* (2006.01)
  *C25B 11/04* (2006.01)
  *H01M 4/90* (2006.01)
  *B01J 31/18* (2006.01)
  *H01M 8/124* (2016.01)
  *B01J 23/755* (2006.01)
  *B01J 27/185* (2006.01)
  *H01M 8/1246* (2016.01)
(52) U.S. Cl.
  CPC .................. *C25B 9/10* (2013.01); *C25B 9/16* (2013.01); *C25B 11/04* (2013.01); *C25B 11/0405* (2013.01); *B01J 23/755* (2013.01); *B01J 27/1853* (2013.01); *B01J 31/18* (2013.01); *H01M 4/90* (2013.01); *H01M 4/9075* (2013.01); *H01M 8/1246* (2013.01); *H01M 2008/1293* (2013.01); *Y02E 60/368* (2013.01)

(56) References Cited

U.S. PATENT DOCUMENTS

| 2011/0048962 | A1 | 3/2011 | Reece et al. |
| 2011/0319257 | A1 | 12/2011 | Wood et al. |
| 2012/0121923 | A1 | 5/2012 | Palumbo et al. |
| 2012/0141779 | A1 | 6/2012 | Agrawal et al. |
| 2012/0164319 | A1 | 6/2012 | Lang et al. |

OTHER PUBLICATIONS

Laursen et al: "Ni5P4 a Game Changing H2 Evolution Catalyst", Twenty-Eighth Annual Symposium of the Laboratory for Surface Modification [online], Mar. 28, 2014 [Retrieved on Apr. 5, 2014}, Rutgers, The State University of New Jersey, Retrieved from the Internet: <URL: http://lsm.rutgers.edu/cgi-server/user-html/news/Symposium2014%20Final_March2014-TG.pdf>, p. 16.

* cited by examiner

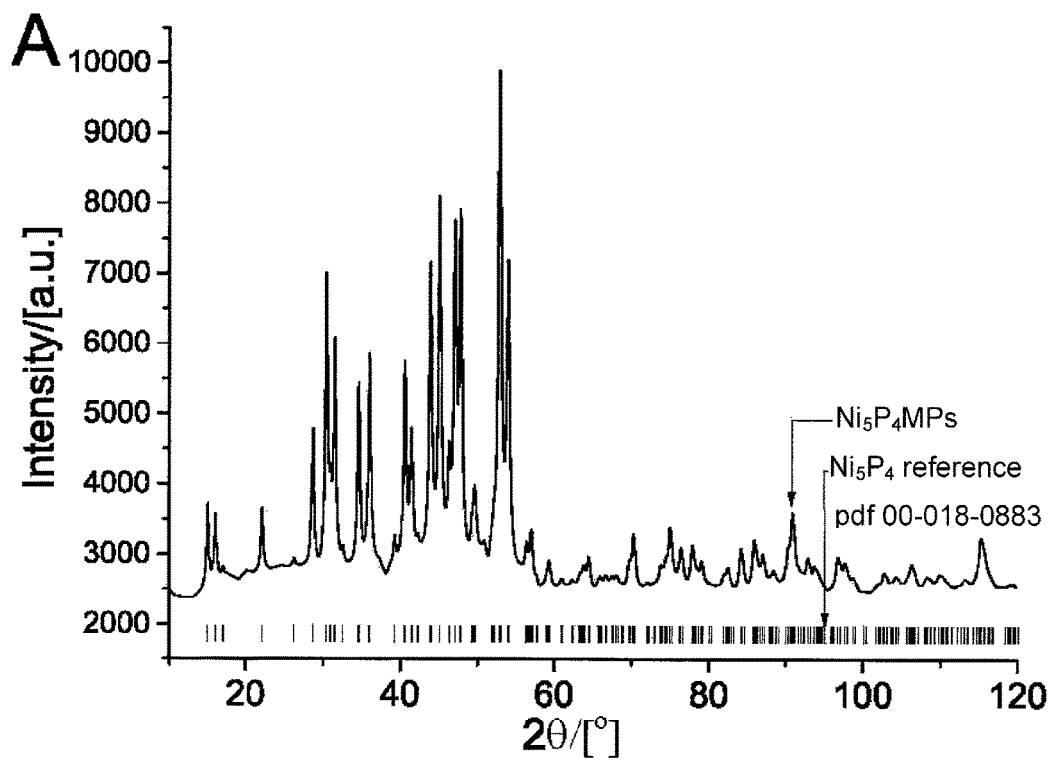
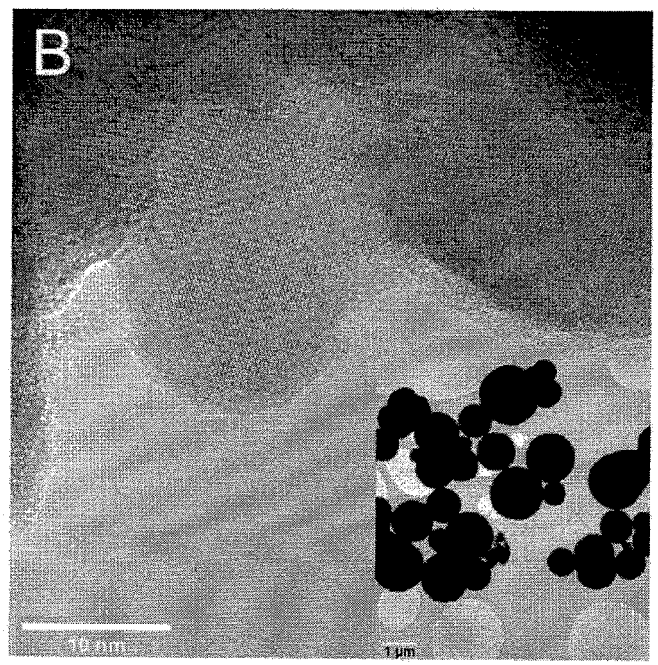
Figures 1 A - B

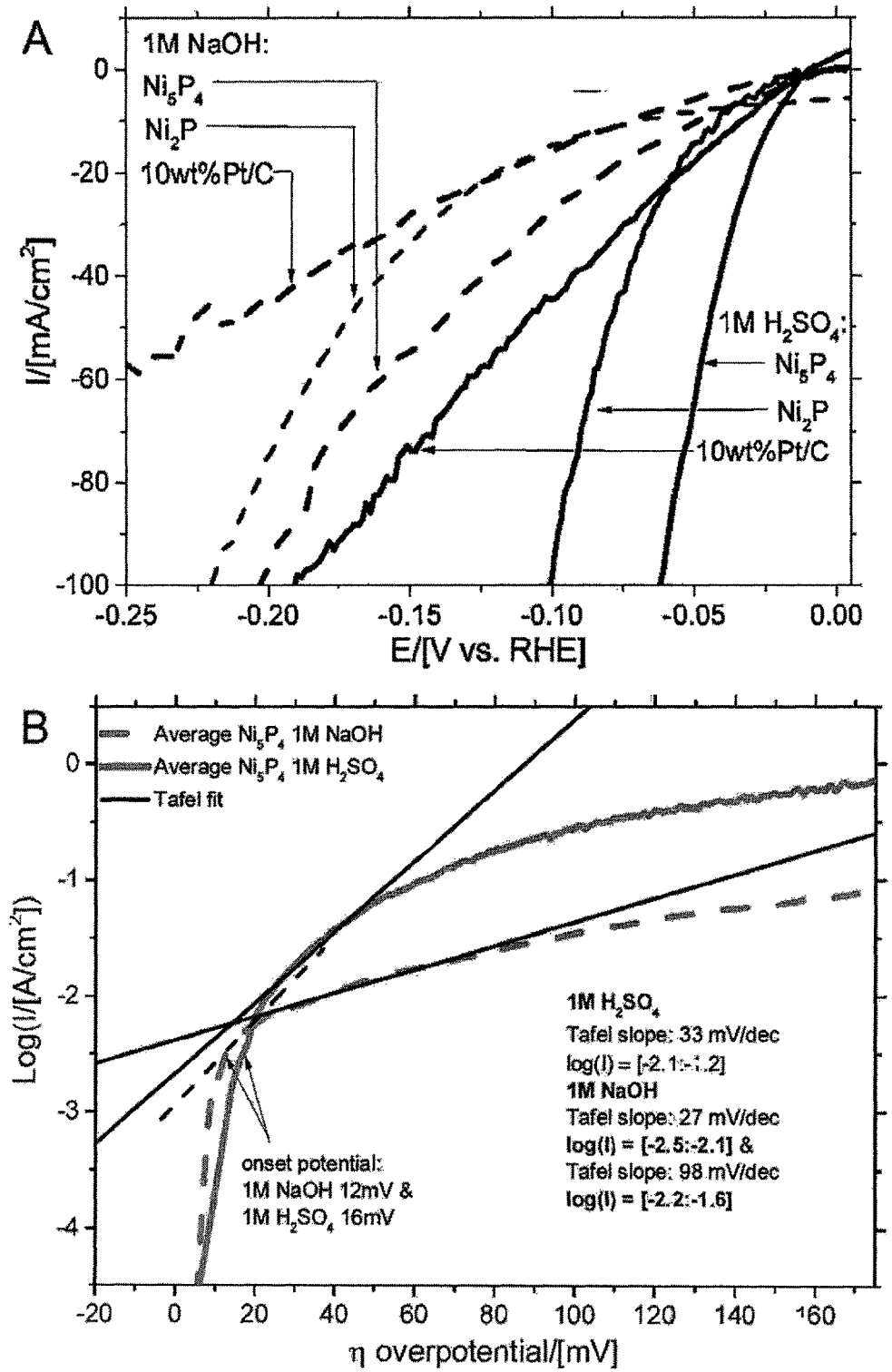
Figures 2 A - B

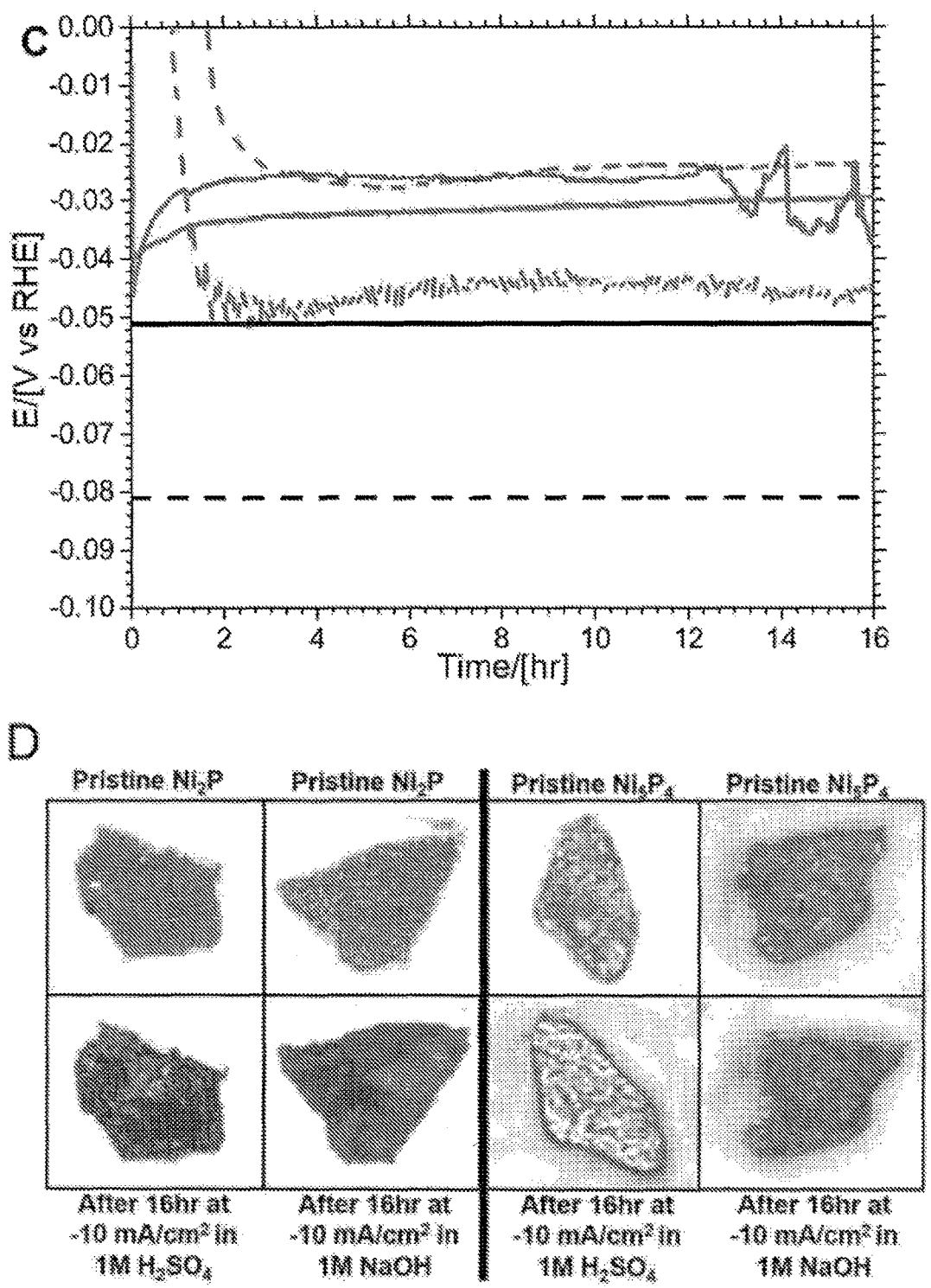
Figures 2 C - D

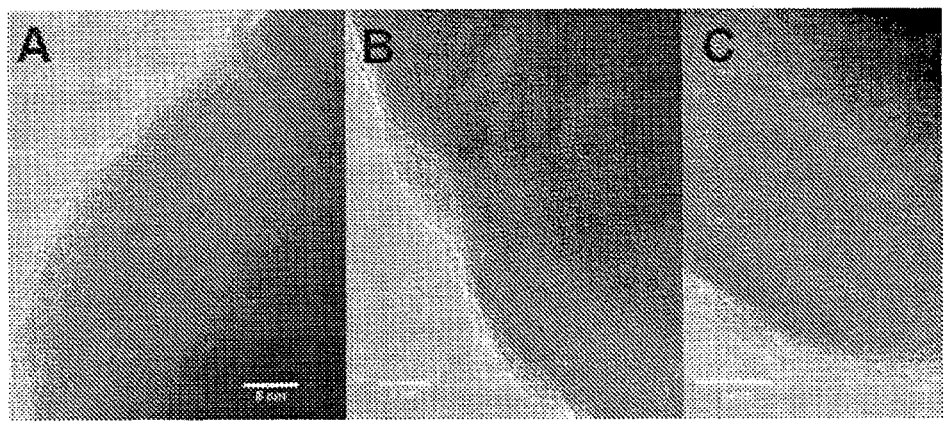
Figures 3 A - C
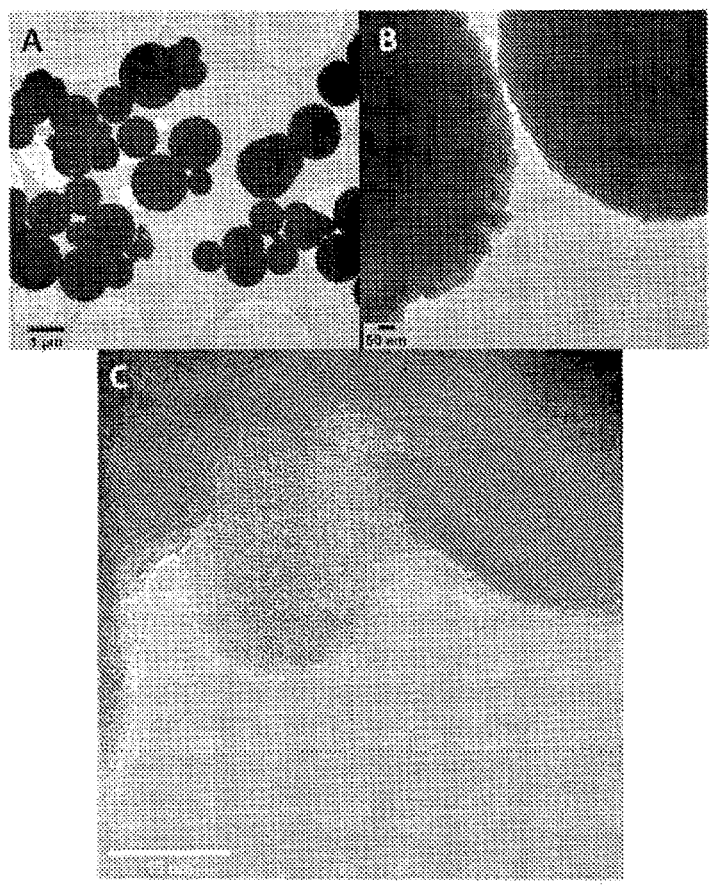
Figures 4 A - C

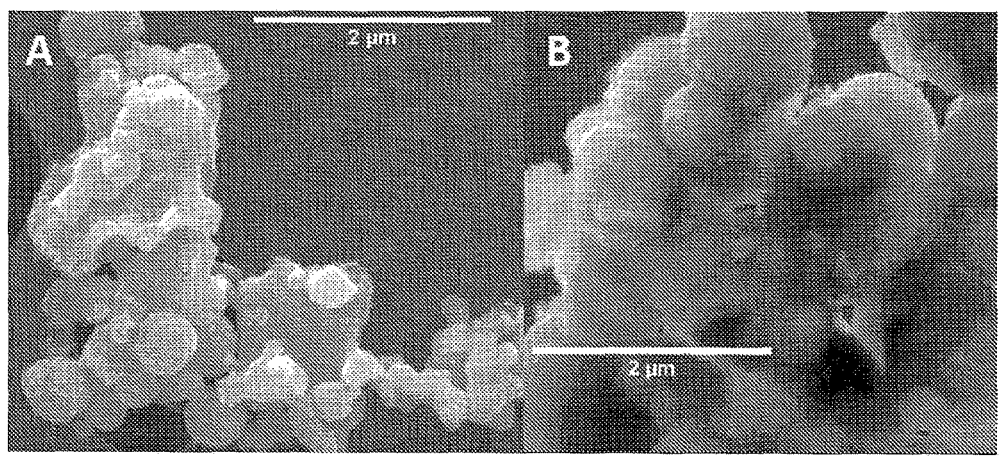
Figures 5 A - B

NICKEL PHOSPHIDES ELECTROCATALYSTS FOR HYDROGEN EVOLUTION AND OXIDATION REACTIONS

FIELD OF INVENTION

The present invention relates to novel electrocatalysts for hydrogen generation by electrolysis of water and hydrogen oxidation for electricity generation, particularly nanocrystalline $Ni_5P_4$, and methods of reversible hydrogen electrocatalysis.

BACKGROUND

The environmental impact of finite fossil energy resources has spurred ever increasing research into renewable energy resources (e.g., solar and wind electricity and solar fuels). These intermittent energy sources entail a need for storage and conversion. Energy can be stored safely and conveniently as chemical bonds, and hydrogen ($H_2$) is one such possible energy carrier. $H_2$ is also a valuable bulk chemical currently produced at large-scale (~63 Mton/yr$^3$) from natural gas. A renewable source of $H_2$ would thus not only be useful for storing intermittent renewable energy, but also serve as a major chemical feedstock.

Although $H_2$ can be produced by electrochemical water splitting, industrial electrolyzers, even where inexpensive electricity is available, operate with high electrical losses due to inefficient catalysts (50-65%) or have high capital costs. Commercial alkaline electrolyzers rely on Ni electrodes that have low efficiencies and degrade over time, but this limitation has been accepted due to the relatively low cost of Ni. Polymer electrolyte membrane (PEM) type electrolyzers use acidic electrolytes and Pt electrodes, the archetypical $H_2$ evolution catalyst owing to its high efficiency for the $H_2$ evolution reaction (HER). On Pt(110) there is no intrinsic overpotential, and each 29 mV of applied potential generates a ten-fold increase in current (Tafel slope of 29 mV/dec). However, Pt is a scarce element ($10^6$ times more scarce than Fe) and very expensive. Consequently, research has focused on developing alternative less expensive, and robust catalysts made from earth abundant elements that are as efficient as Pt.

Molybdenum sulfides are excellent HER catalysts that have low overpotentials (0.1-0.15 V) and low Tafel slopes approximately 40 mV/dec. In addition, a Ni—Mo—N alloy on carbon has also been reported as an efficient HER catalyst with an onset overpotential of 78 mV and Tafel slope of 36 mV/dec. At alkaline pH, Ni or NiMo alloys are highly efficient (−20 mA/cm2 at −80 mV vs RHE) but both degrade in acidic media. Overcoming this instability would offer an inexpensive HER catalyst from abundant materials.

Molecular Ni complexes chelated by organophosphme ligands are active HER catalysts, with turnover frequency ("TOF") of up to 106,000 s$^{-1}$. The [001] facet of the solid state compound $Ni_2P$ was recently suggested as highly active for the HER by computational modeling (DFT). Popezun, E. J. et al., J. Am, Chem. Soc. (2013). There is a continued need, however, to develop alternative, cost-efficient, and efficient HER catalysts. The present invention addresses these needs among others.

SUMMARY OF THE INVENTION

One aspect of the present invention provides a cathode having a conductive support substrate including a catalyst coating. The catalyst coating may include $Ni_5P_4$ nanocrystals. Such nanocrystals have a grain size in the range of from about 5 to about 1800 nm, preferably from about 5 to about 1000 nm, more preferably from about 5 to about 500 nm, and even more preferably from about 5 to about 20 nm.

In certain embodiments, the conductive support substrate is capable of incorporating a material to be reduced, whereby the catalyst coating is able to catalytically interact with the material to be reduced that is incorporated into the conductive support substrate. The material to be reduced can include water or hydrogen cations.

In certain embodiments wherein the material to be reduced is water, the conductive support substrate includes hydrophobic regions and hydrophilic regions, at least some of the $Ni_5P_4$ nanocrystals are in the hydrophobic regions of the conductive support substrate and the water molecules are capable of being incorporated in the hydrophilic regions of the substrate, and at least some of the $Ni_5P_4$ nanocrystals in the hydrophobic regions are able to catalytically interact with water molecules in the hydrophilic region.

Another aspect of the present invention provides a method for generating hydrogen gas from water via an electrolysis reaction wherein the catalyst is part of a conductive support within a cathode. The method includes the steps of (a) placing an anode and a cathode in an electrolye, wherein the cathode includes a conductive support substrate including a catalyst coating including $Ni_5P_4$ nanocrystals, (b) placing the anode and cathode in conductive contact with an external source of electricity, (c) providing a source of water to the cathode, and (d) using the external source of electricity to drive an electrolysis reaction at the cathode, whereby hydrogen gas is generated from the water. In the above method, the $Ni_5P_4$ nanocrystals have grain sizes ranging from about 5 nm to about 1800 nm, preferably from about 5 nm to about 1000 nm, more preferably from about 5 nm to about 500 nm, and even more preferably from about 5 nm to about 20 nm.

An additional aspect of the present invention provides a method for generating hydrogen gas from water via an electrolysis reaction using a free catalyst. The method includes the steps of (a) placing an anode and a cathode in an electrolyte, (b) placing a catalyst in proximity to the cathode, wherein the catalyst comprises $Ni_5P_4$ nanocrystals, (c) placing the anode and cathode in conductive contact with an external source of electricity, (d) providing a source of water to the cathode, and (e) using the external source of electricity to drive an electrolysis reaction at the cathode, whereby hydrogen gas is generated from the water. In the above method, the $Ni_5P_4$ nanocrystals have grain sizes ranging from about 5 nm to about 1800 nm, preferably from about 5 nm to about 1000 nm, more preferably from about 5 nm to about 500 nm, and even more preferably from about 5 nm to about 20 nm.

In another aspect, the present invention provides for a method for reducing hydrogen cations to form hydrogen gas. The method includes the steps of (a) placing an anode and a cathode in an electrolye, wherein the cathode includes a conductive support substrate including a catalyst coating including $Ni_5P_4$ nanocrystals, (h) placing the anode and cathode in conductive contact with an external source of electricity, (c) providing a source of hydrogen cations to the cathode, and (d) using the external source of electricity to drive an electrolysis reaction at the cathode, whereby hydrogen gas is generated at the cathode. In the above method, the $Ni_5P_4$ nanocrystals have grain sizes ranging from about 5 nm to about 1800 nm, preferably from about 5 nm to about 1000 nm, more preferably from about 5 nm to about 500 nm, and even more preferably from about 5 nm to about 20 nm.

In yet another aspect, the present invention provides for a method for generating hydrogen gas from hydrogen cations via an electrolysis reaction using a free catalyst. The method includes the steps of (a) placing an anode and a cathode in an electrolyte, (b) placing a catalyst in proximity to the cathode, wherein the catalyst comprises $Ni_5P_4$ nanocrystals, (c) placing the anode and cathode in conductive contact with an external source of electricity, (d) providing a source of hydrogen cations to the cathode, and (e) using the external source of electricity to drive an electrolysis reaction at the cathode whereby hydrogen gas is generated from the hydrogen cations. In the above method, the $Ni_5P_4$ nanocrystals have grain sizes ranging from about 5 nm to about 1800 nm, preferably from about 5 nm to about 1000 nm, more preferably from about 5 nm to about 500 nm, and even more preferably from about 5 nm to about 20 nm.

The present invention further provides for an electrochemical cell for a hydrogen evolution reaction. The electrochemical cell includes (a) a chamber capable of containing an aqueous electrolyte, (2) an anode in contact with the aqueous electrolyte when the chamber contains the aqueous electrolyte, and (3) a cathode in conductive contact with the anode when the chamber contains the aqueous electrolyte, wherein the cathode includes a conductive support substrate including a catalyst coating including $Ni_5P_4$ nanocrystals.

BRIEF DESCRIPTION OF THE FIGURES

FIG. 1 is (A) a powder X-ray diffraction (PXRD) pattern of $Ni_5P_4$ microparticles and reference pattern, and (B) a high-resolution transmission electron microscopy (HRTEM) image of $Ni_5P_4$ microparticles before catalytic reaction. The presence of lattice spacings extending to the particle surface matching those of $Ni_5P_4$ PXRD references demonstrates $Ni_5P_4$ phase purity and crystallinity.

FIG. 2 shows the electrochemical analyses of $Ni_5P_4$ microparticles, $Ni_2P$ nanoparticles, and 10 wt % Pt/C/Nafion tested in 1M $H_2SO_4$ or 1M NaOH, including (A) the cyclic voltammetry (CV) at 1 mV/s under 1 atm $H_2$, (B) Tafel analysis of $Ni_5P_4$ microparticles at 1 mV/s under 1 atm $H_2$, chronopotentiometric (CP) analysis of all three materials in acid and base at $-10$ mA/cm$^2$ for 16 hours (non-IR corrected), and (D) photographs of the electrode surfaces before and after 16 hours CP analysis in 1 M $H_2SO_4$ and 1 M NaOH.

FIG. 3 is an HRTEM of the surface of $Ni_5P_4$ microparticles after 6 hours of electrolysis in (A) 1M $H_2SO_4$ and (B) 1M NaOH, while (C) shows $Ni_5P_4$ prior to CP analysis.

FIG. 4 shows low resolution TEM images of $Ni_5P_4$ nanoparticles after synthesis.

FIG. 5 shows SEM images of $Ni_5P_4$ particles scraped from an electrode surface after 6 hours of chronopotentiometry in (A) 1M $H_2SO_4$ and (B) 1M NaOH.

DETAILED DESCRIPTION OF THE INVENTION

The present invention is based, at least in part, on the discovery that nickel organophosphine molecular complexes of specific atomic structure that mimics the active site of hydrogenase enzymes are highly active, albeit short-lived, HER catalysts. Amorphous binary alloys comprised of only Ni and P are less active HER catalysts, presumably due to their disordered structure with low density of catalytic sites. Accordingly, the present invention relates to the discovery that among the limited number of stoichiometric compounds of nickel and phosphorous, $Ni_xP_y$, having integer compositions and crystalline phases with characteristic long range order, the HER catalytic activity differs. Furthermore, the present invention relates to the discovery that among the $Ni_xP_y$ compounds their resistance to corrosion during electrolysis in strong acid and strong base differs. Furthermore, one of these nickel phosphide compounds, designated $Ni_5P_4$, is identified as an HER catalyst of exceptional chemical stability in strong acid and strong base. In certain preferred embodiments, the nickel phosphide HER catalyst comprises nanocrystalline $Ni_5P_4$. The nickel phosphide compositions of the present invention are highly efficient hydrogen evolution catalysts under both acidic and alkaline conditions, for the reduction of either a hydrogen cation or water. Also contemplated by the present invention is the effect of crystal lattice structural modifications on HER activity by (1) the partial substitutions of $Ni_5P_4$ at the P side by N, As, or Sb; (2) partial substitutions at the Ni site by other transition metal ions, such as Mn, Fe, Co, or Cu; and (3) partial substitution by aliovalent anions at the P site, such as S and Se.

Applicants have found that electrodes having a conductive substrate with a catalyst coating including nickel phosphide nanoparticle, and preferably $Ni_5P_4$ nanoparticle, exhibit a surprisingly low onset overpotential in both acid and base that outperforms other non-noble catalysts. In certain embodiments, the catalyst compositions of the present invention are more active towards HER reactions and more stable than state-of-the-art Pt catalysts. Such nanoparticles perform close to that of a commercial Pt/C sample, requiring for example only 20-30 mV overpotential (without IR-correction) to produce $-10$ mA/cm$^2$ both in acid and in base for at least 16 hours of electrolysis. The similar potentials of the $Ni_5P_4$ nanoparticles in acid and base for this stable current density is a tradeoff between the larger (98 in V/dec) Tafel slope and smaller onset potential in base, versus the smaller (33 mV/dec) Tafel slope and larger onset potential in acid (as described in further detail below). Applicants have further found that, as compared with $Ni_5P_4$ nanoparticles, $Ni_2P$ nanoparticles demonstrate a larger onset potential and lower Tafel slope, which caused the latter to require an increased overpotential in both acid (37 mV) and base (45 mV) (without IR-correction) at $-10$ mA/cm$^2$. Accordingly, $Ni_5P_4$ electrocatalysts demonstrate unexpected and stable HER activity at both acidic and alkaline pH, and provide the benefit of cost-effective renewable $H_2$ production from water when paired with water oxidation catalysts.

It has been found that, in one embodiment, the nickel phosphide compounds of the present invention are highly active HER catalysts when dispersed within a suitable proton-conducting polymer membrane that is immersed in an aqueous medium and placed into contact with a suitable electrolysis cell. Such hybrid homogeneous-heterogeneous catalysts are active as thin layers in single layer arrangements and are incorporable into multi-layer arrangements. It has been found that, in another embodiment, the nickel phosphide compounds of the present invention are highly active HER catalysts when suspended in aqueous medium and placed into contact with a suitable reductant, including semiconductor photoreductants.

The catalyst compositions of the present invention can be made by conventional procedures known in the art. For example, $Ni_5P_4$ can be synthesized as phase pure nanocrystals using a solvothermal synthesis route adapted from K. Aso et al. (*Inorganic Chemistry*, 2011, 50, 10820-10824). The catalysts in the examples below were synthesized and characterized by physical characterization methods to ascertain their atomic structure and their HER activity is tested electrochemically and by gas chromatography. The inventive catalysts can be used in conjunction with a titanium film electrode, for example, by being pressed into a pellet and bonded to a titanium film electrode via silver paint and sealed in a non-conducting epoxy. Alternatively, the catalysts can be supported on carbon or ceramic powder.

The as-synthesized catalysts of this disclosure have grain sizes in the range from about 5 nm to about 1800 nm, preferably from about 5 nm to about 1000 nm, more preferably from about 5 nm to about 500 nm, and even more preferably from about 5 nm to about 20 nm. These grains are part of larger 0.3-1.8 μm spherical particle agglomerates. The durability of the $Ni_5P_4$ catalyst under electrolysis conditions in both 1M $H_2SO_4$ acid and 1M NaOH, was found to be very good. Evidence comes from both electrochemical stability and X-ray fluorescence confirming atomic composition of the surface, and from physical appearance at the macroscale.

Once aspect of the present invention relates to methods of catalysis and hydrogen evolution reactions, where the catalysts comprise $Ni_5P_4$ nanoparticles, and wherein the reduction uses energy in the form of electricity. The $Ni_5P_4$ catalysts are used either as free unmodified materials or supported on another material. Examples of co-supports include electrically conducting, semi-conducting, and non-conducting supports such as conducting non-metals, metals, metal oxides, semiconductors, conducting and non-conducting polymers, and so forth.

Accordingly, in certain embodiments, the $Ni_5P_4$ catalysts of the present invention are capable of catalyzing the following reactions and their reverse reactions:

Hydrogen cation reduction: $H^+ + e^- \leftrightarrows \frac{1}{2}H_2$ 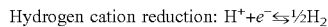

Water reduction reaction: $H_2O + e^- \leftrightarrows \frac{1}{2}H_2 + OH^-$ 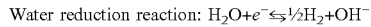

Support Substrates

According to another aspect of the invention the catalyst comprises a catalytic group and a conductive support substrate supporting a plurality of the catalytic groups. In certain embodiments, the support substrate is capable of incorporating hydrogen cations, and at least some of the catalytic groups supported by the support substrate are able to catalytically interact with the hydrogen cations incorporated into the support substrate. In certain other embodiments, the support substrate is capable of incorporating water molecules, and at least some of the catalytic groups supported by the support substrate are able to catalytically interact with water molecules incorporated into the support substrate.

The support substrate has a plurality of porous regions that are microporous, mesoporous, and/or macroporous. In certain embodiments, the support substrate is a microporous substrate having an average pore size of less than about 2 nm. In certain other embodiments, the support substrate is a mesoporous substrate having an average pore size of from about 2 to about 50. In yet other embodiments, the support substrate is a macro-porous substrate having an average particle size of greater than about 50 nm.

"Catalytic groups" include catalytic $Ni_5P_4$ nanoparticles that are able to catalyze a hydrogen evolution reaction by reducing hydrogen cations or water. By "catalytically interact" it is meant that the electrochemical reduction of at least some of the water molecules that contact the catalytic groups is catalyzed by the catalytic groups. In certain embodiments, the catalytic groups include a conductive binder within which the catalytic $Ni_5P_4$ nanoparticles are dispersed. The conductive binder enables the application of a cohesive catalyst coating on the support substrate. Suitable binders include carbon paste or other nanoporous conducting material.

The support substrate is conductive to electrons so that when an electric potential difference is present across separate points on the support substrate, the mobile charges within the support substrate are forced to move, and an electric current is generated between those points. In one embodiment, the support substrate is rendered conductive by applying a thin layer of the support substrate onto a conductive material. Suitable conductive materials include glassy carbon, carbon nanotubes and nanospheres, fluorid doped tin oxide (FTO or $((F)SnO_2)$) coated glass and indium tin oxide (ITO) (or any of the transparent conductive oxides) coated glass, and multilayer structures having nano-structured semiconductor films coated onto the conductive substrates. Other means of causing the support substrate to be conductive are within the scope of the invention. For example, in one embodiment, the support substrate contacts a sensitized semiconductor.

Preferably, the support substrate has hydrophobic regions and hydrophilic regions. In embodiments for the reduction of water, while not wishing to be limited by theory, it is thought that at least some of the catalytic groups can be supported in the hydrophobic regions of the support substrate and once supported are able to catalytically interact with water molecules in the hydrophilic regions. Effectively, the support substrate is thought to act as an interface between hydrogen cations or water molecules and the catalytic groups which are otherwise insoluble in aqueous solution.

In one embodiment, the hydrophobic regions are formed by a hydrophobic polymeric backbone and the hydrophilic regions are regions of ionizable functional groups, preferably on the polymer backbone that can serve as sites for proton conductance. Preferably the ionizable functional groups are sulfonate groups (—$SO_3H$) that lose a proton to form negatively charged sulfonate groups. Alternatively, the ionizable functional groups can form positively charged functional groups that can serve as sites for hydroxide or carbonate ion conductance, if preferred.

The support substrate can be, for example, polysulfones, polysulfonates, and polyphosphonates. In certain preferred embodiments, the supports substrate comprises a sulfonated fluoro-polymer (sold under the trade mark of Nafion®). The hydrophobic $CF_2CF(CF_3)O$— polymer backbone of Nafion® forms a hydrophobic solid that is penetrated by aqueous channels lined with the hydrophilic ionizable sulfonic acid groups. Investigations into the sub-structure of Nafion® coatings on solid surfaces have revealed that the polymer layers contain these hydrophilic channels throughout the otherwise hydrophobic regions of the membrane. These channels allow the diffusion of small molecules such as water.

Other support substrates that could be used include, for example, per-fluorinated sulfonic acid polymer cation-exchange membranes such as F-14100, F-930 and F-950, the GEFC perfluorinated proton exchange membranes, polysulfone ionomers, nanostructured films formed by metal oxide nanoparticles suitably decorated with organic acids including perfluorinated sulfonic acids, nanostructured films formed by the hydrolysis of alkoxysilanes suitably decorated with organic acids including perfluorinated sulfonic acids.

Other supporting substrates can be, for example, poly-fluorinated alkaline exchange membranes (AEM) that rely upon fixed cationic functional groups within the polymer to allow conduction of hydroxide or other mobile anions for conductivity. Conduction of hydrogen ions can be achieved through use of hydroxide, hydrogen carbonate and carbonate among other examples. Examples of commercial AEMs include Tokuyama® AEM. Also within the scope are heterogeneous-homogeneous colloidal systems, two-phase mixtures (stabilized and unstabilized with surfactant), conducting polymers (e.g., poly(3,4-ethylenedioxythiophene) (PEDOT)) surface-modified silica and titania.

Any means of contacting the catalyst with water is within the scope of the invention. In one embodiment, the catalyst is immersed in a solution containing water molecules. The solution can be an aqueous solution containing electrolyte. In another embodiment, the aqueous solution can be a solution from which the water is preferentially removed (i.e., solid liquid separation). For example, where the aqueous solution is salt water or sea water the water could be removed leaving the salt behind (i.e., desalination). In one embodiment about 0.1 M electrolyte is sufficient.

Hydrogen Evolution Reaction, Electrochemical Cells, Photoelectrochemical Cells and Fuel Cells In yet another aspect, the present invention is related to methods of use of the inventive $Ni_5P_4$ catalysts in cathodes for hydrogen evolution reactions in electrochemical cells. The $Ni_5P_4$ catalysts are permanently bonded to conductive metal surfaces and electrically biased at electrical potentials that support the electro-reduction of hydrogen cations or water molecules. The $Ni_5P_4$ catalysts are used in both polymer membrane type electrolyzers and solid oxide fuel cells. Such catalytic oxidation is carried out by electricity from any source, preferably generated from solar or wind sources. In embodiments comprising solar cells, the anodes are driven by electricity generated from a photovoltaic or semiconductor source in an integrated photoelectrochemical cell. The electrolysis applications are carried out in electrolytes having a pH ranging from alkaline to acidic.

The electrolytes carry protons between the anode and cathode. In certain embodiments in which hydrogen cations or water molecules are reduced, the electrolyte is separated from the water. To this end, the support substrates (described above) comprises, on a first side, flow fields allowing water to flow to the anode (as well as removal of $O_2$ gas), and on a second side, and water flow fields to the cathode provide cooling and removal of $H_2$ gas. Accordingly, protons travel through the support substrate. In certain other embodiments, the electrolyte is not separated from the water, thereby enabling protons to travel through the water phase.

Accordingly, one aspect of the present invention provides a cathode including a conductive support substrate, as described above, having a catalyst coating. The catalyst coating comprises a nickel phosphide, preferably $Ni_5P_4$ nanocrystals, in accordance with those described above. In another aspect, the present invention provides for a method for generating hydrogen gas from a material to be reduced in embodiments in which the catalyst is coated onto the conductive support substrate. The reduction method includes the steps of (a) placing an anode and cathode in an electrolyte, (b) placing the anode and cathode in conductive contact with an external source of electricity, (c) providing a source of material to be reduced to the cathode, and (d) using the external source of electricity to drive the reduction reaction at the cathode, whereby hydrogen gas is generated from the material to be reduced. In certain embodiments, the reduction reaction involves an electrolysis reaction, wherein the material to be reduced is water. In certain other embodiments, the reduction reaction involves the reduction of hydrogen cations, wherein the hydrogen cations originate from the anode oxidation reaction of water or hydroxide, and are carried to the cathode either through the ionomer membrane (PEM or AEM type). In certain other embodiments, the conduction of hydrogen cations between the electrodes involves reverse transport of hydroxide ions or carbonate, hydrogen carbonate or other mobile carriers through the ionomer. In certain embodiments, the external source of electricity is provided by renewable sources of electricity, such as solar power or wind power.

Another aspect of the present invention provides for a method of generating hydrogen gas from a material to be reduced in embodiments in which the catalyst is free from a conductive support substrate. Such reduction methods include the steps of (a) placing an anode and a cathode in an electrolyte, (b) placing a catalyst in proximity to the cathode, wherein the catalyst comprises a nickel phosphide, preferably $Ni_5P_4$ nanocrystals, in accordance with those described above, (c) placing the anode and cathode n conductive contact with an external source of electricity, (d) providing a source of a material to be reduced to the cathode, and (e) using an external source of electricity to drive the reduction reaction at the cathode, whereby hydrogen gas is generated from the material to be reduced. In certain embodiments, the reduction reaction involves an electrolysis reaction, wherein the material to be reduced is water. In certain other embodiments, the reduction reaction involves the reduction of hydrogen cations, wherein the hydrogen cations are provided to the cathode through an electrolyte (typically strong acid or strong base). In certain other embodiments, the conduction of hydrogen cations between the electrodes involves transport facilitated by carbonate, hydrogen carbonate or other mobile carriers in the electrolyte.

In one embodiment, the catalyst of the invention is formed on an electrode substrate to provide a cathode. The electrode substrate can be any suitable substrate, for example, glass. As mentioned above, the glass could be coated with, for example, indium tin oxide to render the support substrate conductive. In some embodiments there are multiple layers between the electrode substrate and the catalyst. These layers can replace the conductive material (e.g. indium tin oxide) applied to the electrode substrate. The layers can include a semiconductor and a chemical relay system material.

In certain embodiments, the electrochemical cells comprise a photo-anode. The photo-anode of the invention can be used in a photo-electrochemical cell for the electrolysis of water. The cell can comprise a chamber capable of containing an aqueous electrolyte. The chamber can be bounded by walls so as to contain the aqueous electrolyte within it, or open to allow the aqueous electrolyte to flow through it. The photo-electrochemical cell includes the photo-cathode in combination with an anode, both of which are able to contact the aqueous electrolyte when it is present. When the cell is used, the photo-cathode is in conductive contact with the anode in order to complete the electrical circuit.

Another aspect of the present $Ni_5P_4$ catalyst is the reversible nature of the reaction it catalyzes, being effective in both the (forward) hydrogen evolution and (reverse) hydrogen oxidation reactions. Thus the $Ni_5P_4$ invention is designated as a reversible catalyst for both hydrogen oxidation and hydrogen evolution.

In another embodiment of this invention, the present $Ni_5P_4$ invention may be used as catalysts in fuel cell anodes for catalyzing the hydrogen oxidation reaction in which electricity is generated. The $Ni_5P_4$ catalysts may be used in both polymer membrane type fuel cells and solid oxide fuel cells. The $Ni_5P_4$ material of the anode is permanently bonded to conductive metal surface and catalyzes the electro-oxidation of hydrogen gas. In this application hydrogen is oxidized at the $Ni_5P_4$ anode producing protons and electrons that are delivered to a cathode comprised of a separate catalyst which combines the electrons and protons with oxygen to complete the electrochemical circuit.

Examples of suitable anode materials include metals, conductive non-metals, metal oxides, transparent conductive oxides, semiconductors, and p-type doped semiconductors. The supports include electrically conductive substrates such as carbon paste, carbon nanoparticles, or intrinsically conductive polymers including, for example, polyanilines, polythiophenes (PEDOT), and polyacrylamides.

The electrochemical cell can be used in a method of generating hydrogen and oxygen. In embodiments wherein the cell includes a photo-electrochemical relay system, the cell is exposed to light radiation in order to activate the catalytic groups. The cell is capable of producing hydrogen and oxygen gases which can be collected or immediately used in a further application as desired. In certain embodiments collection is capable wherein the cell is operated at pressures of greater than or equal to about 1 atm within a pressure secure reactor that is capable of pressures in the range of about 1 to about 400 atm. Alternatively, the electrochemical cell can be used in a method of generating electricity (i.e., an electric current). In embodiments wherein a photo-electrochemical relay system is present in the photo-cathode, to generate electricity all that is required is exposure of the cell to light radiation such as sunlight. Optionally, the hydrogen and oxygen generated by the electrochemical cell described above can be passed into a fuel cell for the generation of electrical energy. In some embodiments, a plurality of electrochemical cells are arranged in a series.

The invention also provides a method for preparing an electrochemical cell for use in the electrolysis of water and a hydrogen evolution reaction, the method including the steps of (i) providing a conductive support substrate capable of incorporating a material to be reduced; (ii) allowing $Ni_5P_4$ catalytic groups to self-assemble on the support substrate so that at least some of the catalytic groups are able to catalytically interact with the water molecules; (iii) coating the support substrate having the catalytic groups assembled thereon onto an electrode substrate to provide a cathode; (iv) providing an anode and forming an electrical connection between the anode and the cathode; and (v) providing an aqueous electrolyte between the anode and the cathode to provide an electrochemical cell. In certain embodiments, the electrochemical cell is a photo-electrochemical cell for use in the photo-electrolysis of water, wherein the anode is a photo-anode.

The following examples are provided to further illustrate the methods and compositions of the present invention. These examples are illustrative only and are not intended to limit the scope of the invention in any way.

EXAMPLES

Example 1. Synthesis of $Ni_5P_4$ Nanoparticles

Using a solvothermal synthesis route adapted from K. Aso et al. (*Inorganic Chemistry*, 2011, 50, 10820-10824) $Ni_5P_4$ was synthesized as phase pure nanocrystals ($Ni_5P_4$ NPs). About 0.385 g Ni(acetylacetonate, acac)$_2$.xH2O (Sigma-Aldrich) was placed in a 3-necked flask together with about 2.5 g tri-n-octylphosphine oxide. TOPO (Strem Chemicals). The flask was connected to a condenser in one port, a Schlenk line in the other, and corked in the third. The condenser was connected to a silicone oil bubbler venting into a fumehood.

The flask was degassed under vacuum and then refilled with high purity Ar (Air-liquid). A flow of Ar was established through the flask before adding 10 ml of tri-n-octylphosphine, TOP (Strem Chemicals) wider an Ar blanket. The solution was left under Ar flow for approximately 20 minutes to remove any oxygen. The Ar flow was adjusted to a slow rate 1 bubble per second and the flask was then placed on a pre-heated sand bath at 390° C. for 1.5 hours. The TOPO quickly melted completely and the solution started refluxing and producing white smoke, thereafter turning brown then black. The flask was buried so that the thermoprobe of the temperature controller of the sand bath was level with the top of the reactant liquid and the sand surface was approximately 1 cm above the liquid level.

After reaction for 1.5 hours the flask was removed from the heat and cooled to room temperature. The black solution was transferred to a centrifuge tube with hexanes and diluted 4:10:1 by volume with 96% ethanol (EtOH) and acetic acid (98% Sigma-Aldrich). After centrifugation a gray powder was recovered. The powder was suspended in hexanes by sonication and washed with addition of ethanol and acetic acid, which was repeated twice. The powder was then washed three times in acetone by centrifugation and decantation followed by one cleaning in ethanol. The recovered powder was dried under vacuum.

Example 2. Synthesis of $Ni_2P$ Nanoparticles $Ni_2P$ NPs were synthesized by the procedure published by Muthuswamy et al. (*ACS Nano*, 2011, 5, 2402-2411). About 1.03 g Ni(acac)2.xH2O was placed in a 3-neck flask together with 10 ml n-octylether and 4.6 g oleylamine. The flask was connected to a condenser and Schlenck line as for the procedure for $Ni_5P_4$ nanoparticles described above. The flask was evacuated until bubbling subsided (about 10-15 min), and then a flow of Ar was established and 10.2 ml TOP was added under an Ar blanket. The flask was then evacuated anew and heated lightly by placing it 1 cm above a sand bath preheated to 230° C. The reagents dissolved under bubbling (water removal) and formed a deep green clear solution (approximately 30-60 min). Once all of the Ni(acac)$_2$ had dissolved and bubbling had subsided, the flask was filled with Ar and a slow Ar flow was established. The flask was placed in the preheated sand bath for 1 hour (at 230° C.) during which a dark brown solution was obtained. The flask was placed so that the liquid level was flush with the sand level and the thermoprobe was placed approximately midway between the sand surface and the bottom of the flask.

After 1 hour of reaction the flask was removed from the heat and the sand bath temperature was increased to 350° C. The flask was then re-inserted into the sand bath as described previously and reacted 3 hours. After reaction the flask was removed and allow to cool to room temperature. The $Ni_2P$ nanoparticles were recovered by centrifugation. The reaction solution was diluted 4:10 with acetone and centrifuged to obtain the precipitated particles. The particles were then washed 3 times by suspending in hexanes and precipitating with acetone and acetic acid (4:10:1 by volume). Finally, the product was washed in ethanol and acetic acid (14:1 by volume). After drying in vacuum a black powder was recovered.

Example 3. Electrode Preparation of $Ni_5P_4$, $Ni_2P$, and Pt

Due to the tendency of $Ni_5P_4$ to convert into $Ni_2P$ upon heating above 350° C., the procedure used by Popczun et al.

(*Journal of the American Chemical* Society, 2005, 127, 14871-14878) for thick coatings of $Ni_2P$ nanoparticles could not be applied here; instead 50 mg of each catalyst was pressed into a pellet and bonded to a titanium film electrode via silver paint and sealed in non-conducting epoxy. 50 mg of catalyst was pressed in a 6 mm die allowing the pressure to equilibrate, at 2 tons for 10-15 min then increasing the pressure up to the final 4.5 ton. This pressure was held for 16 hours. After removing from the die the pellet was quartered and each piece attached to 6 mm Ti-foil with Ag-paint (SPI supplies). After drying, the Ti-foil-pellet was attached to a Cu-wire (curled into a spiral in one end) with Ag-paint. When the Ag-paint had cured (overnight at room temperature or 10 min at 120° C.)., The Cu-wire was threaded through a Pyrex glass tube (6 mm diameter). The non-conductive Loctite Hysol 1C epoxy was used to seal the Ti-foil to the glass tube and to cover the edges of the pellet, leaving only the active electrode in contact with solution. After curing for 3-4 hours at room temperature the epoxy was given the final cure at 120° C. for 30 min. The $Ni_2P$ electrode was prepared identically. Comparison to commercial Pt nanoparticles (10 wt % Pt/C, Premetek) served as reference catalyst. This material could not be pressed into a stable pellet, so the catalyst was dispersed in an ink comprised of Nafion (Sigma-Aldrich) and carbon black (42 nm NPs, Strem Chemicals), drop-cast onto a glassy carbon electrode and heat annealed. This electrode is denoted Pt/C/Nafion.

Example 4. Characterization of $Ni_5P_4$ and $Ni_2P$ Nanoparticles

PXRD analysis was performed on a Bruker AXS D8 Advance using a Cu Kα X-ray tube (1.546 Å), a scan time of 1 hour or 12 hours, and a 2θ range of 15-70° or 10-120°. Samples were analyzed prior to electrochemical testing by dispersing the powder on a glass microscope slide and flattening the powder surface using, another glass slide. Electrodes analyzed after electrochemical tests were measured by gently cutting the Ti-foil free from the Pyrex tube and removing the Cu-wire. The pellet and Ti-foil was placed on a glass slide and the PXRD pattern recorded.

HRTEM analysis was performed at 200 keV, vacuum pressure of about $2 \times 10^{-7}$ Torr, and operated using the standard imaging and diffraction mode. Powder samples from the electrodes were placed on an Au mesh TEM grid (300 mesh, 3 mm in diameter) that was previously covered by a thin carbon layer (support film). These samples were also analyzed using SEM operated at 15 kV and 5 kV accelerating voltage, 140 pA probe current, 2,000 cps as average count rate on the whole spectrum, and a counting time of 60 second.

Electrodes were run for 6 hours prior to analysis in either 1M NaOH or 1M $H_2SO_4$ under continuous $H_2$ bubbling. Then quickly removed from the cell and rinsed in copious amounts of Nanopure water followed by light rinsing in ethanol and dried at room temperature. The solution exposed nanoparticles were removed by scratching the surface of the electrode in a drop of high purity acetone. The acetone was then removed and dropped onto a lacey carbon film on an Au-grid. After drying the samples was examined in the microscope.

FIG. 1(A) shows the PXRD pattern of the $Ni_5P_4$ microparticles. Complete agreement with the reference pattern identifies the material as crystalline and the atomic structure as single phase-$Ni_5P_4$, while the Scherrer equation indicates an average particle size of about 20 nm. HRTEM further confirmed both the $Ni_5P_4$ phase from lattice spacings and the NP crystallite size range of 5-20 nm, as shown in FIG. 1(B). All crystallites were found to be fused together to form larger spherical particles, size 0.3-1.8 micrometers, as shown in the insert in FIG. 1(B). HRTEM images also show individual particles are encapsulated in a thin, 1.1±0.5 nm, amorphous shell. The X-ray transmission dependence on atomic number relative to $Ni_5P_4$, indicates that the shell is amorphous carbon a byproduct derived from thermolysis of the organophosphorus precursor.

From the low resolution TEM images in FIG. 4(A) it can be seen that the $Ni_5P_4$ sample consists mainly of compact (non-porous) spherical particles ranging from 0.3 to 1.8 μm with the major fraction being 1-2 μm. The observed size range is collaborated by the measured $N_2$ BET surface area which is less than 1 $m^2/g$. At intermediate and high magnifications, FIGS. 4(B) and 4(C), respectively, spherical particles may be seen to consist of crystalline sintered nanoparticles ranging in size from 3 to 68 nm; the sintering is attributed to the high reaction temperature of about 390° C. The larger sizes of these nanoparticles have a regular rectangular shape and exhibit regular lattice spacing indicating they are comprised of single monophasic crystals of $Ni_5P_4$.

The SEM images in FIG. 5 for the $Ni_5P_4$ samples run for 6 hours in cyclic voltammetry measurements show the same size range as observed in HRTEM from less than 0.5 μm to about 0.2 μm. The particles show little difference in size in either acidic or alkaline conditions, which is indicative of the particles not dissolving or changing significantly during HER activity.

Representative HRTEM images from both of the $Ni_5P_4$ samples tested in 1M $H_2SO_4$ and 1M NaOH are shown in FIGS. 3(A) and 3(B). From the HRTEM images it may be seen that the particles show lattice planes that extend to the particle surface. This is evidence that no amorphization of the particle surface has occurred. The particles still show the approximately 1 nm low contrast amorphous C shell after reaction, which is a further indication that the surface has not changed during catalysis.

Example 5. Tafel Analysis

Electrochemical analyses were performed on a Princeton Advanced Research PASRSTAT 2263 Advanced Electrochemical System potentiostat. A 3-electrode 2 compartment glass cell was used. The counter electrode was a 1×1 cm boron-doped CVD diamond electrode and the reference was a Pine instrument Mini Ag/AgCl(gel) (E=0.197 V vs. SHE). The cell was continuously purged with $H_2$ during experiments. For measurements of products by gas chromatography a sealed single compartment cell was used. Prior to gas measurements the cell was purged with high purity Ar for 10-20 min, and the head space was measured by GC to be free from detectable amounts of $O_2$, $N_2$, or $H_2$ after this time.

FIG. 2(A) shows cyclic voltammograms (CV) from the electrodes prepared as described above from $Ni_2P$, $Ni_5P_4$ and 10 wt % Pt/C/Nafion, and tested in 1M $H_2SO_4$ or 1M NaOH under 1 atm $H_2$ (reversible conditions). The intrinsic (onset) potentials for the HER in acid and base are summarized, in Table 1.

TABLE 1

HER Electrocatalysis

| Compound | HER Intrinsic (onset) potential[1], mV vs. RHE | Tafel slope, mV/decade current density | HER Faradaic efficiency, % $H_2$ yield | Estimated TOF/[mol $H_2$/mol surface atoms/s] ($\eta$ = 100 mV/200 mV) |
|---|---|---|---|---|
| $Ni_5P_4$ | −16 (acid) | 33 (acid) | 92% ± 1% $H_2$ (acid)[3] | 0.28/0.73 (acid) |
|  | −12 (base) | 27 (base)[2] | 93% ± 5% $H_2$ (base)[3] | 0.063/0.23 (base) |
| $Ni_2P$ | −36 (acid) | 38 (acid)[2] | N/A | $1.2 \cdot 10^{-3}/5.1 \cdot 10^{-3}$ (acid)[4] |
|  | −19 (base) | 118 (base) |  | $3.2 \cdot 10^{-4}/1.1 \cdot 10^{-3}$ (base) |
| 10% Pt/C | −5 (acid) | 27 (acid) | 89% ± 2% $H_2$ (acid) | 13.5/32.1 (acid) |
|  | −7 (base) | 32 (base) | 89% ± 3% $H_2$ (base) | 4.71/13.7 (base) |

[1] The intrinsic (onset) potential was obtained as the potential at which the current slope drops almost vertically (see FIG. 2(B)).
[2] Tafel slopes are given near onset in the range log(I) = −2.6−−1.6. Tafel slopes at higher current densities are 98 mV/dec ($Ni_5P_4$) and 82 mV/dec ($Ni_2P$).
[3] $H_2$ and $O_2$ determined by GC after passing 6C (coulombs) during electrolysis in a one compartment cell.
[4] Popezun et al. reports TOF = 0.015 s$^{-1}$ at $\eta$ = 100 mV and TOF = 0.5 s$^{-1}$ at 200 mV using NPs of $Ni_2P$ on Ti-foil.

The $Ni_5P_4$ onset potential in acid is 11 mV higher than Pt/C/Nafion, and 20 mV lower than $Ni_2P$. In base, the onset potential for $Ni_5P4$ is 7 mV lower than for $Ni_2P$ and 5 mV higher than for Pt/C/Nafion. FIG. 2(B) plots the logarithm of current density versus overpotential for which the slopes above onset and below mass transport limitation reveals the electrical potential cost per decade of current (Tafel slope). The Tafel slope in acid, and hence HER kinetics, is approximately the same for $Ni_5P_4$, Pt, and $Ni_2P$ at low current densities with a differences of only 5-6 mV/dec. By contrast, in alkaline solution the HER kinetics on $Ni_5P_4$ are considerably faster than on $Ni_2P$ in this region with a difference of 90 mV/dec in Tafel slopes. At higher current densities in base the Tafel slope difference drops to 16 mV/dec (favoring $Ni_2P$) where impedance differences due to diffusion limitations and electrode design contribute. Comparing $Ni_5P_4$ to Pt/C/Nafion reveals very similar kinetics in base with only 5 mV/dec difference. Tafel slopes for Pt/C/Nafion, 27 mV/dec (acid) and 32 mV/dec (base). The above comparisons show that the intrinsic HER kinetics on Pt and $Ni_5P_4$ are indistinguishable in both acid and base, thereby establishing $Ni_5P_4$ as efficient as Pt for $H_2$ evolution electrocatalysis at low current density.

Table 1 gives the turn-over frequency (TOF) estimated at 100 and 200 mV overpotentials. Because of the large difference in NP sizes, catalyst dispersion and method for electrode preparation, direct comparisons cannot be conclusively made. Direct comparison of electrode pellets prepared from $Ni_5P_4$ MPs and $Ni_2P$ NPs shows a 200 fold higher TOF in both acid and base for $Ni_5P_4$. The TOF of $Ni_5P_4$ is about 2 orders of magnitude lower than for Pt/C/Nafion in both acid and base. This difference is attributed to: (1) the unlikely assumption that all 50 mg of the $Ni_5P_4$ pressed pellet (approximately $1.21 \cdot 10^6$ atomic layers) is in contact with electrolyte; and (2) the larger particle size of $Ni_5P_4$ (0.3-1.8 μm vs. 2 nm for Pt). Further increased activity is expected if methods for making $Ni_5P_4$ thin-film or $Ni_5P_4$ NPs can be devised. The TOF of $Ni_5P_4$ is on par with NiMo alloy, a highly efficient earth-abundant alkaline HER catalyst, having TOFs of 0.05 s$^{-1}$ and 0.36 s$^{-1}$ at $\eta$=100 mV and $\eta$=200 mV under alkaline conditions.

Example 6. Stability of $Ni_5P_4$

Faradaic conversion to $H_2$ and electrode degradation were investigated after 16 hours chronopotentionmetric (CP) electrolysis at −10 mA/cm$^2$ in both acid and base by HRTEM, SEM, SEM-EDS, and PXRD. FIG. 2(C) shows the time dependence of the potential difference (RHE adjusted for pH) of new (unconditioned) $Ni_5P_4$, $Ni_2P$, and Pt/C/Nafion electrodes. In acid both $Ni_5P_4$ and $Ni_2P$ exhibit short term increase in activity over ~2 hours to steady-state values that favor $Ni_5P_4$ by 7 mV at 16 hours. In base both $Ni_5P_4$ and $Ni_2P$ exhibit short term decreasing potential over ~2 hours to a steady-state values that favor $Ni_5P_4$ by 21 mV at 16 hours.

FIG. 3 shows an HRTEM image of a $Ni_5P_4$ microparticles' surface after 6 hours of electrolysis in acid (A) and base (B) vs. before electrolysis (C). The particles show no sign of surface reconstruction and the presence of the amorphous orphans carbon coating, indicates that particle size and shape were retained. Surface analysis by SEM-EDXS at multiple locations gave the average formula: $Ni_{5.00}P_{4.19}$ and $Ni_{5.05}P_{4.20}$ after electrolysis in acid and base, respectively, further indicating retention of the initial catalyst composition. SEM images further corroborate the unchanged range of particle size and morphology between samples electrolyzed in acid and base (see FIGS. 7(A) and 7(B)). All lines of evidence indicate chemical and electrochemical stability of $Ni_5P_4$ in both acid and base. By contrast, electrolysis of $Ni_2P$ over this same period of time causes degradation as seen by macroscopic swelling and cracking of pellets (FIG. 2(D)). The Pt/C/Nafion membranes degrade in acid and base due to loss of particles and loss of membrane adhesion to the electrode.

There are at least seven structurally distinct stoichiometric phases of nickel and phosphorus that are isolable phases below 800° C. Applicants have found that such compositions exhibit very little loss in activity after 16 hours of $H_2$ evolution in both acidic and alkaline media, thus straddling 14 pH units. The HER activity of $Ni_5P_4$ was compared to both $Ni_2P$ and Pt; it was found that $Ni_5P_4$ performs better than $Ni_2P$ under comparable conditions and is more stable in both acidic and alkaline electrolytes. Nanocrystalline $Ni_5P_4$ performs almost as well as Pt/C supported catalyst.

What is claimed is:

1. A cathode comprising a conductive support, said support comprising a porous conductive material, said material comprising $Ni_5P_4$ nanocrystals, wherein the porous material has there-within a plurality of porous regions, and wherein said porous regions consist of (1) hydrophobic regions and (2) hydrophilic regions; wherein
    the hydrophobic regions comprise a hydrophobic polymer backbone,
    the hydrophilic regions comprise regions of ionizable functional groups on said polymer backbone,
    at least some of the $Ni_5P_4$ nanocrystals are in the hydrophobic regions of the conductive support, and water molecules are capable of being incorporated in the hydrophilic regions of the conductive support, and at least some of the $Ni_5P_4$ nanocrystals in the hydrophobic regions are able to catalytically interact with water molecules in the hydrophilic regions; and the support is electrically conductive.

2. The cathode of claim 1, wherein the $Ni_5P_4$ nanocrystals have grain sizes in the range of from about 5 to about 1800 nm.

3. The cathode of claim 2, wherein the $Ni_5P_4$ nanocrystals have grain sizes in the range of from about 5 to about 1000 nm.

4. The cathode of claim 1 wherein the $Ni_5P_4$ nanocrystals have grain sizes in the range of from about 5 nm to about 500 nm.

5. The cathode of claim 1 wherein the $Ni_5P_4$ nanocrystals have grain sizes in the range of from about 5 nm to about 20 nm.

6. The cathode of claim 1 wherein the porous material is of a type selected from the group consisting of microporous, mesoporous, and macroporous, and combinations thereof.

7. The cathode of claim 1, wherein the conductive support is capable of incorporating a material to be reduced, whereby the catalyst coating is able to catalytically interact with the material to be reduced incorporated into the conductive support.

8. The cathode of claim 7, wherein the material to be reduced comprises water.

9. The cathode of claim 7 wherein the material to be reduced comprises hydrogen cations.

10. An electrochemical cell for a hydrogen evolution reaction comprising:
    (1) a chamber capable of containing an aqueous electrolyte;
    (2) an anode in contact with the aqueous electrolyte when the chamber contains the aqueous electrolyte; and
    (3) the cathode according to claim 7;
    said cathode being in conductive contact with said anode when the chamber contains the aqueous electrolyte.

11. A method for generating hydrogen gas from water via an electrolysis reaction, comprising:
    (a) placing an anode and the cathode of claim 1 in an electrolyte;
    (b) placing said anode and cathode in conductive contact with an external source of electricity;
    (c) providing a source of water to said cathode; and
    (d) using said external source of electricity to drive an electrolysis reaction at said cathode;
    whereby said hydrogen gas is generated from said water.

12. The method of claim 11, wherein $Ni_5P_4$ nanocrystals have grain sizes in the range of from about 5 to about 1800 nm.

13. The method of claim 12, wherein $Ni_5P_4$ nanocrystals have grain sizes in the range of from about 5 to about 1000 nm.

14. A method for reducing hydrogen cations to form hydrogen gas, comprising:
    (a) placing an anode and the cathode of claim 1 in an electrolyte:
    (b) placing said anode and cathode in conductive contact with an external source of electricity;
    (c) providing a source of hydrogen cations to said cathode; and
    (d) using said external source of electricity to reduce said cations at said cathode;
    whereby hydrogen gas is generated at said cathode.

15. The method of claim 14, wherein $Ni_5P_4$ nanocrystals have grain sizes in the range of from about 5 to about 1800 nm.

16. The method of claim 15, wherein $Ni_5P_4$ nanocrystals have grain sizes in the range of from about 5 to about 1000 nm.

17. A method for generating hydrogen gas from water via an electrolysis reaction, comprising:
    (a) placing an anode and a cathode in an electrolyte;
    (b) placing a catalyst in proximity to said cathode, wherein said catalyst comprises $Ni_5P_4$ nanocrystals;
    (c) placing said anode and cathode in conductive contact with an external source of electricity;
    (d) providing a source of water to said cathode; and
    (e) using said external source of electricity to drive an electrolysis reaction at said cathode;
    whereby said hydrogen gas is generated from said water.

18. The method of claim 17, wherein $Ni_5P_4$ nanocrystals have grain sizes in the range of from about 5 to about 1800 nm.

19. The method of claim 18, wherein $Ni_5P_4$ nanocrystals have grain sizes in the range of from about 5 to about 1000 nm.

20. A method for generating hydrogen gas from hydrogen cations, comprising:
    (a) placing an anode and a cathode in an electrolyte:
    (b) placing a catalyst in proximity to said cathode, wherein said catalyst comprises $Ni_5P_4$ nanocrystals;
    (c) placing said anode and cathode in conductive contact with an external source of electricity;
    (d) providing a source of hydrogen cations to said cathode; and
    (e) using said external source of electricity to drive an electrolysis reaction at said cathode;
    whereby said hydrogen gas is generated from said hydrogen cations.

21. The method of claim 20, wherein $Ni_5P_4$ nanocrystals have grain sizes in the range of from about 5 to about 1800 nm.

22. The method of claim 21, wherein $Ni_5P_4$ nanocrystals have grain sizes in the range of from about 5 to about 1000 nm.

* * * * *

UNITED STATES PATENT AND TRADEMARK OFFICE
CERTIFICATE OF CORRECTION

| | |
|---|---|
| PATENT NO. | : 10,358,727 B2 |
| APPLICATION NO. | : 15/109348 |
| DATED | : July 23, 2019 |
| INVENTOR(S) | : G. C. Dismukes et al. |

It is certified that error appears in the above-identified patent and that said Letters Patent is hereby corrected as shown below:

In the Specification

Column 1, Line 12, should read:
STATEMENT REGARDING FEDERALLY SPONSORED RESEARCH
This invention was made with government support under grant number CMMI1066055 awarded by the United States Air Force of Scientific Research. The government has certain rights in the invention.

Signed and Sealed this
Third Day of October, 2023

Katherine Kelly Vidal
*Director of the United States Patent and Trademark Office*